United States Patent [19]

Papmahl

[11] 4,254,521

[45] Mar. 10, 1981

[54] ANCHORED MARINE FLUID TRANSFER BUOY

[75] Inventor: Fritz Papmahl, Königswinter, Fed. Rep. of Germany

[73] Assignee: LGA Gas and Marine Consult GmbH, Remagen-Rolandseck, Fed. Rep. of Germany

[21] Appl. No.: 932,527

[22] Filed: Aug. 10, 1978

[30] Foreign Application Priority Data

Aug. 18, 1977 [DE] Fed. Rep. of Germany ....... 2737228

[51] Int. Cl.³ ..................... B63B 21/52; B63B 51/02
[52] U.S. Cl. ...................................... 9/8 P; 114/230; 114/294; 405/202; 405/207; 285/45
[58] Field of Search ............... 166/356; 405/202, 195, 405/207, 210; 285/45; 114/256, 257, 230, 264; 9/8 R, 8 P

[56] References Cited

U.S. PATENT DOCUMENTS

| 3,310,322 | 3/1967 | Carrol | 285/45 |
| 3,527,294 | 9/1970 | Weiss | 166/356 |
| 3,766,582 | 10/1973 | Lloyd | 9/8 P |
| 3,883,912 | 5/1975 | Pedersen | 9/8 P |
| 3,983,937 | 10/1976 | Marquaire | 166/356 |
| 4,010,500 | 3/1977 | Reid | 9/8 P |
| 4,026,119 | 5/1977 | Dotti | 405/202 |

Primary Examiner—Trygve M. Blix
Assistant Examiner—D. W. Keen
Attorney, Agent, or Firm—Thomas R. Morrison

[57] ABSTRACT

A marine fluid transfer buoy is anchored to the sea bed employing two vertically displaced cardan joints. Connection between an undersea pipe and the fluid transfer buoy is made coaxial with the lower cardan joint and connection to a riser pipe to the surface is made coaxial to the upper cardan joint. All twist in the conduit at the connections is accommodated within a pressure container intersected by the two cardan axes which provides a protected dry environment for the conduit within.

23 Claims, 5 Drawing Figures

ANCHORED MARINE FLUID TRANSFER BUOY

BACKGROUND OF THE INVENTION

The present invention relates to techniques for transferring fluids to and from vessels offshore using and undersea pipe and a buoy supported deliery hoe.

Offshore loading and unloading of fluid tankers, for instance, petroleum tankers, is necessary in the case of certain deep-draft vessels where suitable deep water channels to shore loading and unloading points are unavailable. In addition, much oil exploration and production occurs from underwater drilling at sea. Both of these make it necessary and convenient to transfer fluids and gasses, for example, natural gas, to and from a floating vessel at sea.

In the prior art, it has been customary to anchor a tower-type floating buoy to a sea bed using an anchor plate rigidly secured to the sea bed and attached to the tower by means of a universal joint or cardan joint. A stationary, usually rigid, undersea line leads to the base of the buoy and a flexible line is connected from there up the tower to a transfer point above the surface of the water.

The flexible line is subjected to constant flexure as the tower is moved around by the action of wind, waves and tides and thereby experiences continuous alternation of stress. This makes the flexible lines subject to wear and can cause oil spills upon rupture. In addition, the undersea environment makes inspection and replacement of flexible lines difficult, expensive and dangerous. Furthermore, the weakening of the flexible line due to flexure as previously discussed is accelerated by the strong outside pressure from depths of as much as 100 meters or more.

The problem of wear in flexible undersea lines encountered in transferring liquid or gaseous products is significantly compounded when it is desired to transfer heated or cooled materials. In particular, the transmission of cryogenic temperature products such as liquefied natural gas or ammonia requires substantial insulation to prevent foaming of the material being transferred and/or the freezing of sea water about the lines. The use of flexible lines are incompatible with this requirement.

SUMMARY OF THE INVENTION

The present invention solves the problem experienced by the prior art in transferring fluid products from the sea bed to a transfer point above the water level while permitting normal tilting motion of an anchored rigid buoy. The present invention eliminates flexible lines in contact with sea water and permits access to connections inside a dry controlled environment.

A buoy tower extending above the surface of the water is tethered at its lower end to an anchor plate by a pair of cardan joints having their axes horizontal and 90° to each other. The tower is therefore permitted to tilt about the cardan joints in any direction in response to environmental forces. The two cardan joints are displaced one above the other to provide a lower cardan joint and an upper cardan joint. The axis of each of the two cardan joints intersects a sealed, water-free chamber having an access hatch therein.

A supply line on the sea bed, which may be an insulated line or a double walled line, is connected through a connection coaxial with the lower cardan axis into the interior of the sealed vessel. From the interior of the sealed vessel, the line is connected to a second connection coaxial with the second cardan joint and is connected outward through the second connection to a rigid riser line which is connected up the length of the buoy tower to a point above the water line. Since the portion of the line inside the sealed vessel is in a dry, protected environment, and since this portion of the line experiences only rotational motion and no stretch or flexure, it is possible to employ a flexible line in this location if desired. Alternatively, one or more rotary joints can be used inside the sealed vessel in order to reduce the twist on the line. If a rotary joint is employed coaxial with each of the two cardan joints, rigid line can be used throughout.

It is within the contemplation of the present invention that the two cardan joints may be at the same height. That is, the axis of each cardan joint may intersect the axis of the other. In the preferred embodiment, however the construction is simplified by vertically displacing the two cardan joints.

According to a first embodiment of the invention, a sealed pressure vessel is pivoted at a lower cardan joint to a support which is, in turn, rigidly connected to an anchor plate attached to the sea bed. A rigid insulated supply line is connected to a connection feeding through the lower cardan joint. In the interior of the pressure vessel, a rigid or flexible line is connected between the lower cardan joint and an upper cardan joint. Through the upper cardan joint, a connection is made from the interior of the pressure vessel to a rigid riser conduit which feeds upward above the water level to the transfer point between buoy and vessel. The interior of the pressure vessel is evacuated of water and may normally be filled with inert gas such as dry nitrogen under pressure to retard deterioration of interior components. The inert gas may be replaced with breathable air and an access hatch may be employed to permit entry by maintenance personnel for inspection and maintenance in the dry controlled environment within the pressure vessel. All twist on the line due to tilt of the tower is accommodated within the pressure vessel.

In a second embodiment of the invention, the transfer buoy tower is connected through upper and lower cardan joints to an anchor plate. A first pressure vessel, rigidly affixed to the anchor plate is intersected by an extension of the axis of the lower cardan axis. A second pressure vessel, rigidly affixed to the buoy tower is intersected by an extenion of the upper cardan axis. A rigid supply line is rigidly connected to the first pressure vessel. A line inside the first pressure vessel exits through a first connection which is coaxial with the lower cardan axis. A rigid line is connected from the first connection to a second connection which enters the second pressure vessel coaxial with an extension of the upper cardan axis. A line inside the second pressure vessel is connected to a rigid riser line for delivering fluid material up the tower. All twist in the lines due to rotation about the lower cardan axis is accommodated within the first pressure vessel and all twist in the lines due to rotation about the upper cardan axis is accommodated within the second pressure vessel. Both pressure vessels are pumped free of water and have access hatches for entry of inspection and maintenance personnel. This embodiment permits up to four separate supply lines to be connected through cardan joints without resorting to separate coaxial sets of cardan joints.

Each of the two pressure vessels in the second embodiment is preferably made in two sections. The first section contains the rotary connection entry and the second section contains the access hatch. The two first sections including the rotary connection entries are manufactured ashore with the rigid conduit connecting them and are floated into position below the water where they are connected, by means well known in the art, to the second portions of the pressure vessels already in place. Thereupon, the interior of the pressure vessels are pumped clear of water and the internal connection of lines are made by personnel who enter through the access hatch.

The second embodiment of the invention has the advantage that the cardan joints and rotary connections are physically separated. Consequently, malfunction in one should not necessarily impair the function of the other.

Although particularly adapted to the transfer of low temperature liquids such as a liquefied natural gas, liquefied petroleum gas, ammonia or other cold material with temperature below the freezing point of water, the transfer device of the present invention is suitable for all liquids or gases including crude oil and petroleum products and corrosive liquids.

DETAILED DESCRIPTION OF THE PREFERRED EMBODIMENT

Figure 1:
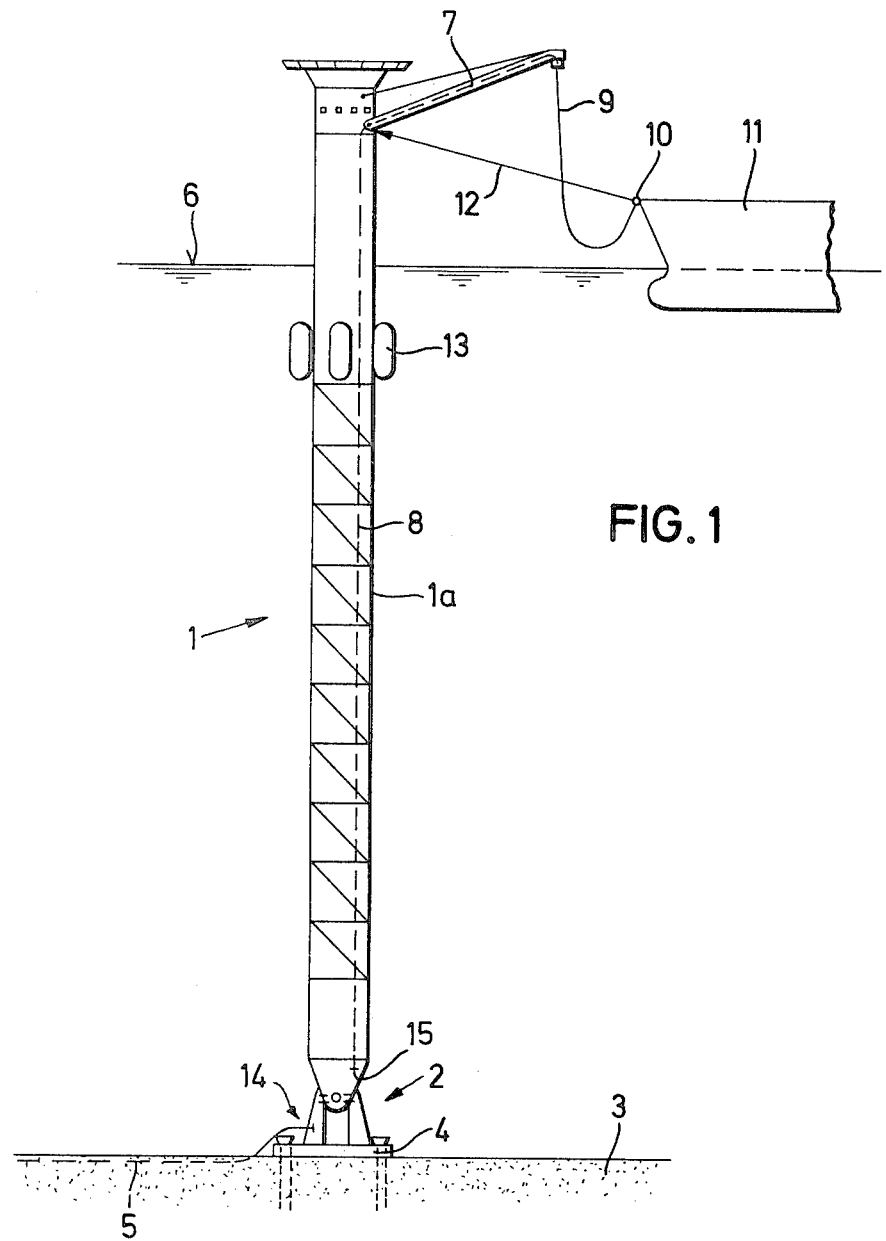
FIG. 1 shows an outline of an anchored marine fluid transfer buoy according to the present invention.

Referring now to FIG. 1, there is shown generally at 1 an anchored marine fluid transfer buoy according to the present invention. A substantially rigid buoy tower 1a having buoyancy tanks 13 is anchored at its bottom end through a cardan joint 2 to the sea bed 3 using an anchor plate 4.

A rigid supply line 5 feeds fluid through the cardan joint 2 in a manner which will be described in detail to a riser line 8 which is connected above the sea level 6 to a cantilever arm 7 from the top of the buoy tower 1a.

A tanker vessel 11 is moored to the buoy tower 1a by means well known in the art such as hawser 12. A delivery hose 9 is connected from cantilever arm 7 to a transfer point 10 on the tanker 11.

The buoy tower 1a can be of considerable height above the sea bed 3 for example as much as 100 meters or more. The buoy tower 1a is permitted by the cardan joint 2 to tilt about the cardan joint 2 in any direction dictated by the environmental forces on the tower 1a and the tanker 11. As will be explained, the tilting of the buoy tower does not affect rigid supply line 5 or its connection to the tower.

Reference numerals 14 and 15 indicate the termination points of the rigid supply line and the riser line respectively. The two embodiments of the invention to be described in the following disclose the manner by which fluid material can be connected between terminal points 14 and 15 without the employment of flexible hoses and the like exposed to the sea.

Figure 2:
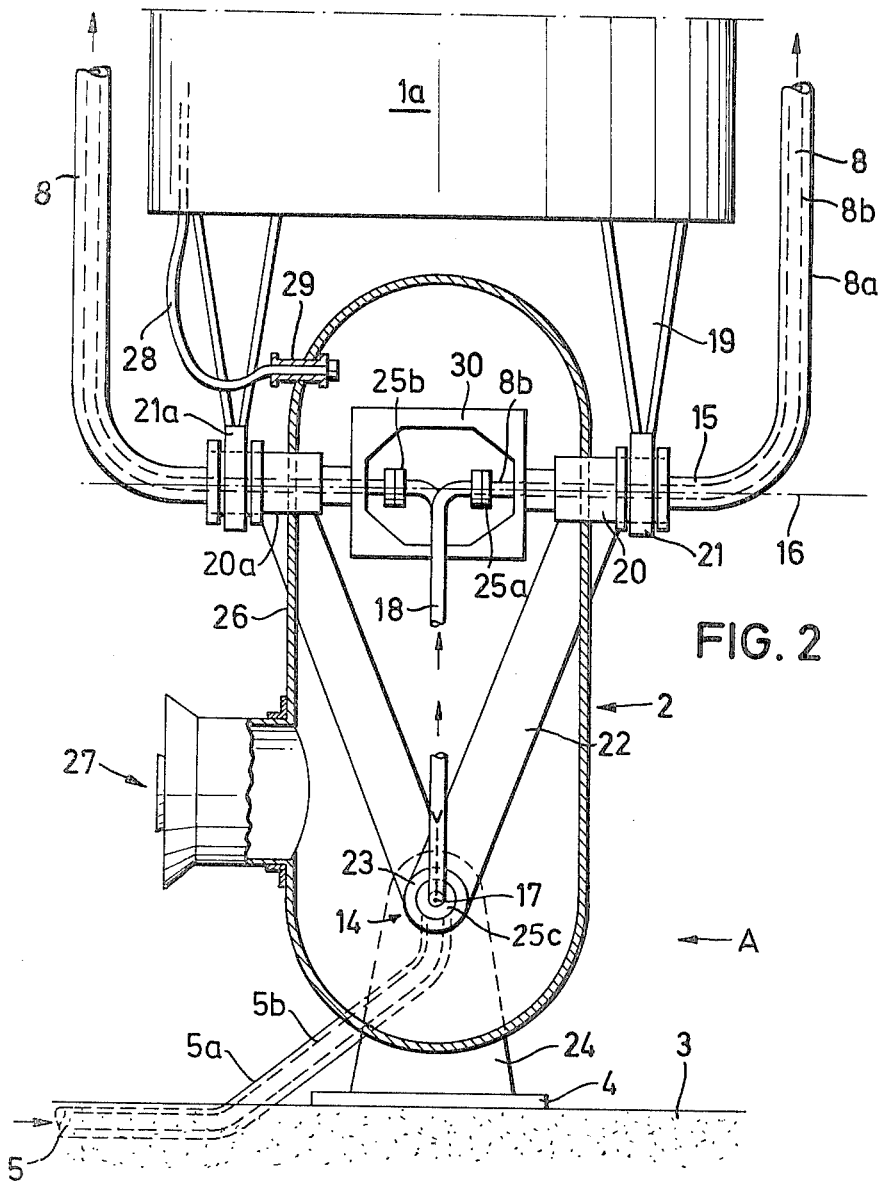
FIG. 2 shows a partial section view of a first embodiment of the invention.

Referring now to the portion of the system shown in FIG. 2, the supply line 5 is shown as a double walled line having an outer jacket 5a enclosing a spaced inner conduit 5b. The space between the outer jacket 5a and inner conduit 5b may be filled with air, gas or insulating material. The space or insulation between the outer jacket 5a and inner conduit 5b permits flowing hot or cold material through the inner conduit 5b without excessively heating or cooling the outer jacket 5a.

Figure 3:
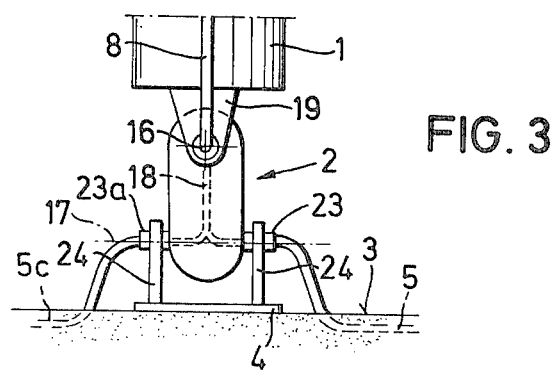
FIG. 3 shows a partial view of the first embodiment of the invention rotated 90° from the view in FIG. 2.

As additionally shown in FIG. 3, the rigid supply line 5 is connected through a lower sleeve which is, in turn, connected by two supports 24 to anchor plate 4. A second rigid supply conduit 5c may optionally be connected through a second lower sleeve 23a.

A pressure tank 26 is pivotally attached to the first and second lower sleeves 23, 23a and forms therewith a lower cardan joint having an axis 17 coaxial with lower sleeves 23 and 23a. Leakage through the lower sleeves 23, 23a is prevented by conventional means such as stuffing boxes, not shown.

Displaced from lower sleeves 23, 23a and having their axis rotated 90° therefrom, a pair of upper sleeves 20, 20a are fitted to the pressure vessel 26. In the embodiment shown, the upper sleeves 20, 20a are rigidly affixed to the pressure vessel and move therewith. A plurality of feet 19 are connected from the base of the buoy tower 1a and to bearings 21 which transmit stresses from the buoy tower 1a through the upper sleeves 20, 20a to the pressure tank 26. Struts 22 may optionally be employed to transfer stresses from the upper sleeves 20, 20a to the lower sleeves 23, 23a.

The axis of the upper sleeves 20, 20a, rotatable in the upper bearings 21, 21a, form an upper cardan axis 16 at right angles to the lower cardan axis 17.

The rigid riser line 8, which may have an outer jacket 8a and an inner conduit 8b spaced therefrom with gas or insulating material therebetween, is rigidly connected to move with the buoy tower. The riser line is deformed to pass through the upper sleeve 20 coaxial with the upper cardan axis 16 to thereby permit the upper sleeve to rotate about it without flexure.

The outer jacket 8a may be terminated inside the pressure vessel leaving the inner conduit 8b exposed. Since the pressure vessel is free of water and may optionally contain an inert gas atmosphere, this does not present the problem of excessive gain or loss of heat to the material being transferred. A strut 30 may optionally be employed to resist the external pressure on the upper sleeves 20, 20a.

A connecting line 18 connects the material being transferred from the lower cardan axis 17 to the upper cardan axis 16. A rotary joint 25a may be employed coaxial with the upper cardan axis to permit rotation of the connecting line 18 with respect to the inner conduit 8b which, as previously described, is fixed to move with the buoy tower 1a. Similarly, a rotary joint 25c may be employed coaxial with the lower cardan axis 17 to permit rotation of the connecting line 18 with respect to the inner conduit 5b of the rigid supply line 5.

An access hatch 27 of a type well known in the art is provided in the wall of the pressure tank 26. The access hatch 27 is fitted with means for connecting thereto from a diving capsule, not shown, to permit entry into the interior of the pressure tank 26 without becoming immersed in the sea. The cardan joints associated with axes 16 and 17 as well as the related rotary joints and connecting line 18 are accessible and can be worked on from the dry and environmentally controlled interior of the pressure tank 26. Consequently, replacement and repairs of internal components are readily made. One or more flexible supply lines 28 for air, inert gas, electrical power or signals are connected from the buoy tower through a seal 29 into the interior of the pressure tank 26. The use of a flexible line for flexible supply line 28 is permitted in this application because the flexible supply line 28 is of small diameter and is thus less subject to flexure damage than is the main conduit which carries the product being transferred.

Figure 4:
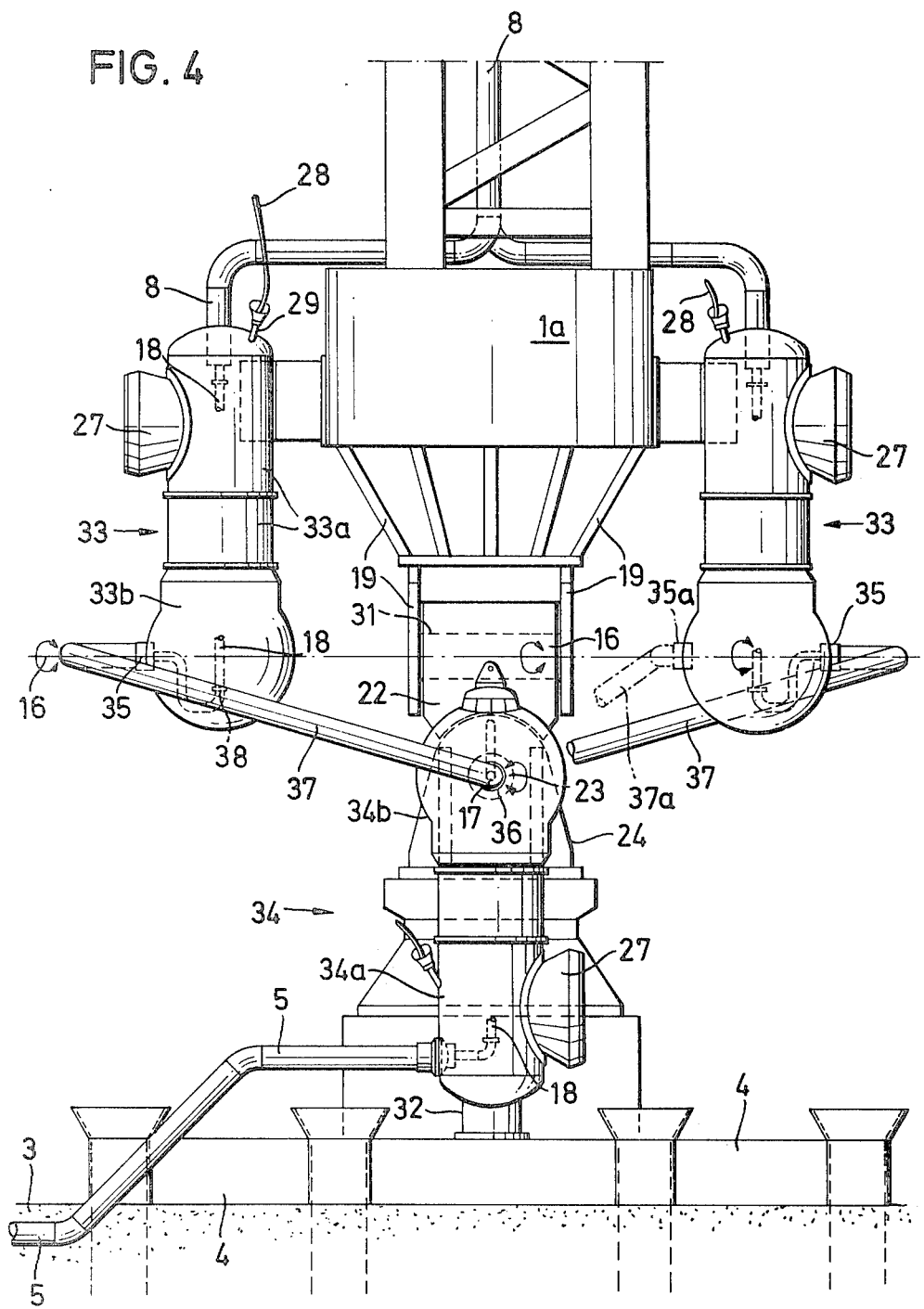
FIG. 4 shows a partial view of a second embodiment of the invention.

In the second embodiment shown in FIG. 4, the lower sleeve 36 is coaxial with but offset from the lower cardan axis 17. Similarly, the upper sleeve 35 is coaxial with and offset from the upper cardan axis 16. In this structure, the anchor plate 4 is connected by support 24 directly to the lower journal making up the lower cardan axis 17. The struts 22 are directly connected from the lower journal to an upper journal 31 shown in dashed line about which the feet 19 and buoy tower 1a rotate. There is no fluid flow associated with the lower and upper journals of the cardan joint in this embodiment.

A lower pressure tank 34 is rigidly mounted, for example, by base 32, to anchor plate 4. The lower pressure tank consists of an access portion 34a to which rigid supply line 5 is connected and a lower sleeve portion 34b connected together by means well known in the art. A rigid connection line 37, which may be insulated as previously described, is connected between lower sleeve 36 and upper sleeve 35. Upper sleeve 35 enters upper pressure tank 33 at upper sleeve portion 33b which is connected to upper access portion 33a.

Rotary joints, similar to those employed at 25a and 25b in FIG. 2 may be employed to permit the use of rigid connecting line 18 within the two pressure tanks 33, 34. Alternatively, flexible line may be used for connecting line 18 within the pressure tanks 33, 34b.

If a flexible line is used for connecting line 18 without the use of rotary joints, its life can be improved by increasing the length of connecting line 18 so as to distribute deformations over a greater length. This may be accomplished as shown in FIG. 4 by deforming the inner conduit of rigid connection line 37 as shown inside 33b to place the connection 38 offset from the cardan axis 16. The same technique may also be used in the lower pressure tank 34 as well as in pressure tank 26 shown in FIG. 2.

Figure 5:
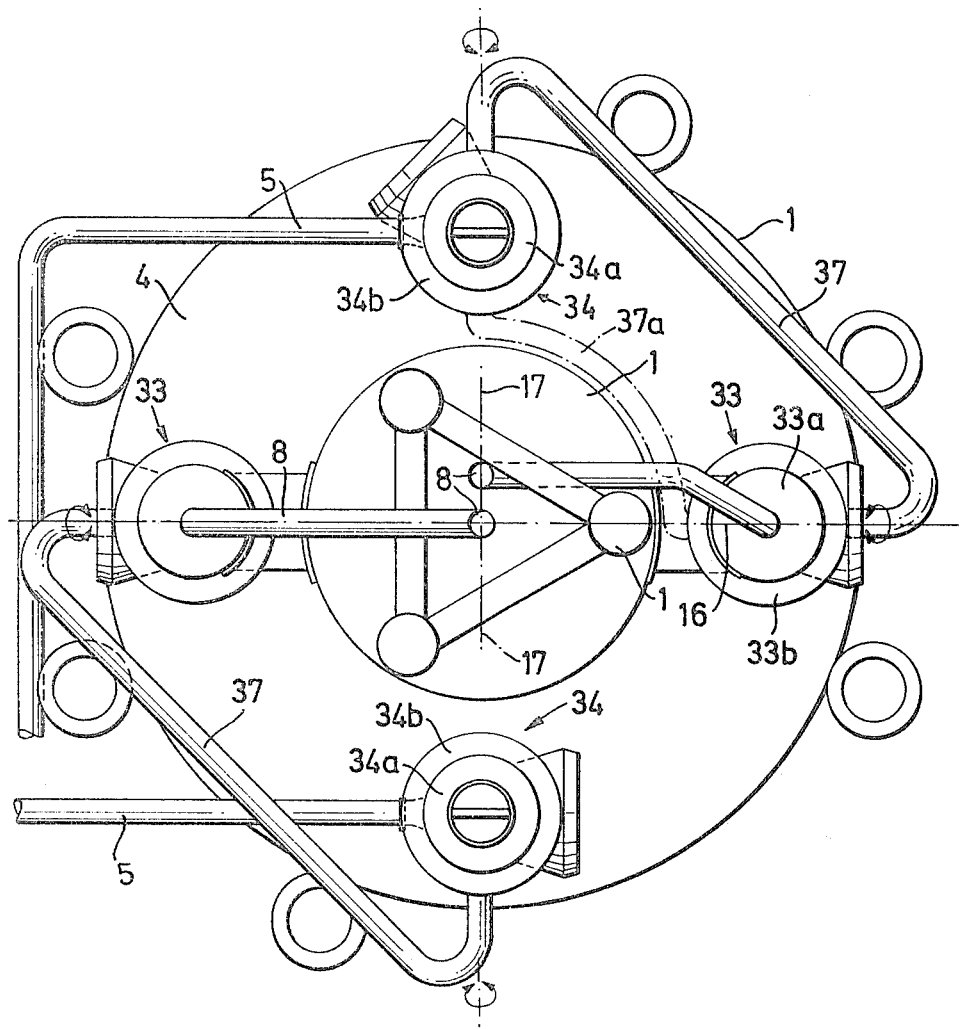
FIG. 5 shows a plan view of the second embodiment of the invention including additional supply and riser lines.

Since the lower and upper pressure tanks 34, 33 are displaced from the cardan joints 17, 16, two entries can be determined on each of the pressure tanks which coincide with the corresponding cardan axis. Furthermore, two pressure tanks can be employed at opposed sides of each of the two cardan axes. Consequently, four separate rigid supply lines can be connected through the embodiment shown in FIG. 4 to four separate riser lines leading to the surface. For example, the upper pressure tank 33 to the right of the drawing shows, in dashed line, a second upper sleeve 35a connected to a second rigid connection line 37a feeding the left side of this upper pressure tank. The same treatment can be employed on the left upper pressure tank 33. The routing of additional connections is more clearly shown in the plan view of FIG. 5 which shows the second rigid connection line 37a in dashed line between the lower pressure tank 34 and upper pressure tank 33. Although not shown in the drawing, one skilled in the art would realize that a second connection line could be connected between the other two pressure tanks.

Returning now to FIG. 4, it is contemplated that the buoy tower 1a would be connected through the cardan axes 16 and 17 to the anchor plate 4 without the upper and lower sleeve portions 33b, 34b being installed. It is contemplated that the upper and lower sleeve portions connected by the rigid connection line 37 be prefabricated as a unit, floated to the site, sunk and connected to the corresponding axes portions 33a, 34a by well known underwater pressure tight connections and that the water be thereupon pumped from the assembly to provide a dry working environment within the two pressure tanks 33, 34. Thereafter, a diving vehicle may deliver workmen through the access hatches 27 for installation of the connecting line 18 in each pressure tank 33, 34.

It is further within the contemplation of the invention that additional pressure tanks may be employed having sleeves entering concentric to the respective cardan axes 16, 17 to increase the capacity of the system.

It will be understood that the claims are intended to cover all changes and modifications of the preferred embodiments of the invention, herein chosen for the purpose of illustration which do not constitute departures from the spirit and scope of the invention.

What is claimed is:

1. An anchored marine fluid transfer buoy comprising:
   (a) an anchor plate affixed to the sea bed;
   (b) a buoyed tower having its top extending above the surface of the sea;
   (c) cardan joint means having at least one cardan axis for connecting the bottom of said tower to said anchor plate;
   (d) at least one pressure tank;
   (e) a fluid supply line;
   (f) first connection means coaxial with said at least on cardan axis for connecting said fluid supply line to said at least one pressure tank;
   (g) a riser line from said at least one cardan joint means up said tower above the surface of the sea;
   (h) second connection means between said first connection means and said riser line;
   (i) the interior of said at least one pressure tank being substantially free of water;
   (j) at least part of said second connection means being within the interior of said at least one pressure tank; and
   (k) said fluid supply line, first connection means, second connection means and riser line forming a fluid-tight conduit effective to isolate said fluid from contact with said cardan joint means.

2. The buoy recited in claim 1 further comprising:
   (a) said cardan joint means being first and second cardan joints having first and second cardan axes at right angles to each other;
   (b) said first connection means entering said at least one pressure tank coaxial with said first cardan axis; and
   (c) said second connection means including entering means entering said at least one pressure tank coaxial with said second cardan axis.

3. The buoy recited in claim 2 wherein said first and second cardan axes do not intersect.

4. The buoy recited in claim 1 further comprising:

(a) said cardan joint means being first and second cardan joints having first and second cardan axes at right angles to each other;
(b) said at least one pressure tank being a pressure tank intersected by said first and second cardan axes, the intersection containing means for forming said first and second cardan joints;
(c) said first connection means being connected to said pressure tank coaxial with said first cardan axis;
(d) said second connection means including a second cardan axis connection between said riser line and said pressure tank coaxial with said second cardan axis; and
(e) said second connection means also comprising a connection line within said pressure tank between said first connection means and said second cardan axis connection.

5. The buoy recited in claim 4 further comprising the junction with at least one end of said connection line being offset from cardan axes.

6. The buoy recited in claim 1 wherein said cardan joint means and at least said first connection means are physically separated.

7. The buoy recited in claim 1 further comprising:
(a) said at least one pressure tank being at least upper and lower pressure tanks;
(b) said lower pressure tank being rigidly connected to said anchor plate;
(c) said upper pressure tank being rigidly connected to said tower;
(d) said cardan joint means having a first axis whose extension intersects said lower pressure tank and a second axis whose extension intersects said upper pressure tank; and
(e) said first connection means rigidly entering said lower pressure tank, passing therethrough and exiting said lower pressure tank coaxial with said first cardan axis.

8. The buoy recited in claim 7 further comprising:
(a) at least one connection line from said lower pressure tank to said upper pressure tank; and
(b) said connection line being coaxial to said first cardan axis at its connection to said lower pressure tank and coaxial to said second cardan axis at its connection to said upper pressure tank.

9. The buoy recited in claim 8 further comprising said second connection means including an interior connecting line from the connection to said upper pressure tank coaxial with said second cardan axis, through said second pressure tank and a riser connection to said riser line.

10. The buoy recited in claim 9 further comprising:
(a) first and second upper pressure tanks on opposed sides of said tower;
(b) first and second lower pressure tanks on opposed sides of said tower;
(c) said at least one connection line being a first connection line between said first lower pressure tank and said first upper pressure tank and a second connection line between said second lower pressure tank and said second upper pressure tank.

11. The buoy recited in claim 10 wherein said first and second upper pressure tanks, first and second lower pressure tanks and first and second connecting lines are respectively identical.

12. The buoy recited in claim 1 further comprising rotary joint means in said at least one pressure tank connecting a portion of said second connection means.

13. The buoy recited in claim 1 further comprising access hatch means for personnel and equipment access to the interior of said at least one pressure tank.

14. The buoy recited in claim 13 further comprising at least part of said second connection means being accessible to workmen in the interior of said at least one pressure tank.

15. The buoy recited in claim 1 further comprising said interior being filled with inert gas.

16. The buoy recited in claim 1 further comprising said supply line and said riser line being thermally insulated lines.

17. The buoy recited in claim 1 further comprising said first connection means being two connections wherein each of said two connections are coaxial with the same cardan axis.

18. The buoy recited in claim 1 further comprising at least one connection to said at least part of said second connection means being offset from cardan axes.

19. The buoy recited in claim 1 further comprising:
(a) said supply line and riser line being outside said cardan joint means; and
(b) at least part of said second connection means being within said cardan joint means.

20. The buoy recited in claim 1 further comprising said supply line, riser line and second connection means being outside said cardan joint means.

21. The buoy recited in claim 1 further comprising:
(a) said at least one pressure tank being outside said cardan joint;
(b) said at least one pressure tank being on an extension of said at least one cardan axis; and
(c) said first connection means being coaxial to an extension of said at least one cardan axis.

22. An anchored marine fluid transfer buoy comprising:
(a) an anchor plate affixed to the sea bed;
(b) a buoyed tower having its top extending above the surface of the sea;
(c) first and second displaced cardan joints having first and second cardan axes located at right angles to each other connecting the bottom of said tower to said anchor plate;
(d) a pressure tank enclosing said first and second cardan axes;
(e) a supply line connected at a first point to said pressure tank coaxial with said cardan axes;
(f) a riser line connected at a second point to said pressure tank concentric with said second cardan axis;
(g) a connecting line inside said pressure tank between said first point and second point;
(h) said supply line, connecting line and riser line forming a fluid-tight conduit effective to isolate said fluid from contact with said first and second displaced cardan joints; and
(i) the interior of said pressure tank being gas filled.

23. An anchored marine fluid transfer buoy comprising:
(a) an anchor plate affixed to the sea bed;
(b) a buoyed tower having its top extending above the surface of the sea;
(c) first and second displaced cardan joints having first and second cardan axes located at right angles to each other connecting the bottom of said tower to said anchor plate;
(d) a first pressure tank rigidly attached to said anchor plate;
(e) an extension of said first cardan axis passing through said first pressure tank;
(f) a second pressure tank rigidly attached to said tower;
(g) a supply line connected to said first pressure tank;
(h) a riser line connected from said second pressure tank to above the surface of the sea;
(i) an interconnecting line between said first and second pressure tanks, said interconnecting line being connected at its first end coaxially with an extension of said first cardan axis and being connected at its second end coaxially with an extension of said second cardan axis;
(j) rotation absorbing means within said first and second pressure tanks for absorbing substantially all rotational motion between said supply, riser and interconnecting lines from tilting of said tower;
(k) said supply line, riser line, interconnecting line and rotation absorbing means forming a fluid-tight conduit effective to isolate said fluid from contact with said first and second cardan joints; and
(l) the interior of said first and second pressure tanks being gas filled.

* * * * *